April 12, 1932. V. F. BOZEMAN 1,853,718
ROTARY HOE
Filed May 25, 1931

INVENTOR
Virgil F. Bozeman
BY Brown, Jackson,
Boettcher & Dienner
ATTORNEY

Patented Apr. 12, 1932

1,853,718

UNITED STATES PATENT OFFICE

VIRGIL F. BOZEMAN, OF MOLINE, ILLINOIS, ASSIGNOR TO DEERE & COMPANY, OF MOLINE, ILLINOIS, A CORPORATION OF ILLINOIS

ROTARY HOE

Application filed May 25, 1931. Serial No. 539,638.

The present invention relates to improvements in cultivating implements commonly known as rotary hoes, and has to do particularly with the construction of the hoe wheels with which such implements are equipped. As is well known, these hoe wheels comprise a hub member provided with radially extending teeth adapted to enter the soil in the forward rolling motion of the wheels over the ground, a series of such wheels being mounted side by side upon a common transversely extending shaft. The present invention is characterized by the provision of a hoe wheel provided with steel teeth, and while it is old in the art to make hoe wheels provided with steel teeth, so far as I am aware all prior devices of this type have been objectionable owing to the fact that each tooth was riveted to the hub member with one or more rivets, generally one rivet near the hub portion and another spaced outwardly radially therefrom. This contruction necessitated drilling a hole or holes through the teeth for receiving the rivets, thereby materially weakening the teeth at such points and increasing the cost of manufacture. My present invention has for its principal object to provide a hoe wheel equipped with steel teeth so connected with the hub portion of the wheel whereby the above noted objections are overcome.

A further object of the invention is to provide improved means for reenforcing the several teeth of the wheel at a point intermediate their ends where bending stresses and breakage are more apt to occur during operation, and for holding the outer ends of the teeth suitably spaced apart without the use of rivets and the like.

Further objects and advantageous features will appear from the following description of the invention taken in connection with the accompanying drawings, in which—

Figure 1:
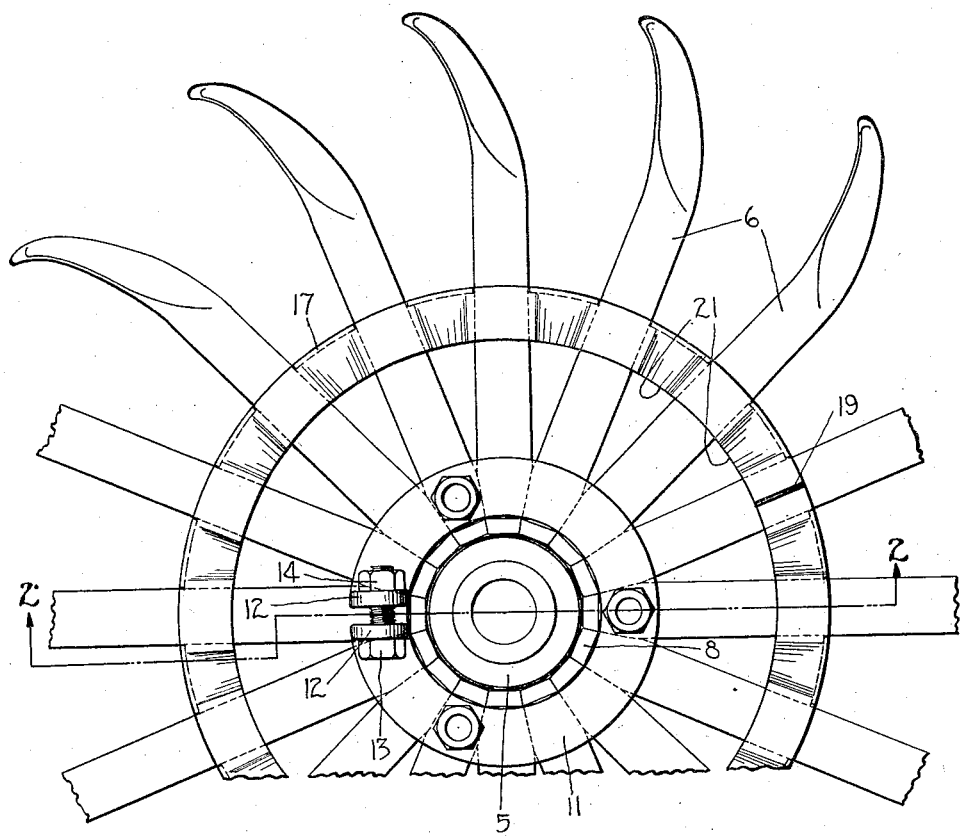
Fig. 1 is a side view of my improved wheel, partly broken away.

Referring to the drawings, 5 indicates the hub member of the wheel which is in the form of a suitable casting. Extending outwardly radially from said hub member are a plurality of steel teeth 6 which are secured to said hub member as hereinafter described. Each tooth is suitably shaped on its outer end as is usual in hoe wheels, and as shown the two side edges of the inner end of each tooth are cut away or beveled toward each other, as indicated at 7, so that they may be nested together in radial formation about a common center. The inner end of each tooth is bent to form a laterally extending lug 8 which occupies a position at right angles to the main portion of the tooth, as shown in Fig. 2.

The hub member 5 is provided with an outwardly extending circumferential flange 9 which provides a right-angular shaped circumferential recess 10 extending around said hub, and the inner ends of the several teeth are positioned in said recess so that each tooth extends outwardly radially from said hub member. Owing to the bevel formation of the side edges of the teeth at their inner ends said teeth nest snugly against each other when in assembled position, as shown in Fig. 1.

Figure 2:
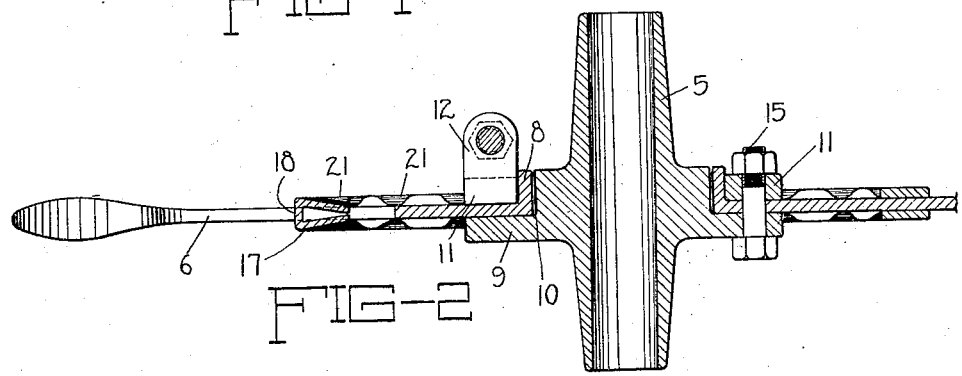
Fig. 2 is a section taken on the line 2—2 of Fig. 1.

For securing the several teeth to the hub member, I provide a flat split ring plate 11 which, when in position, rests against one side face of each of the several teeth, as shown in Fig. 2, and encircles the laterally extending lugs 8 on the inner ends of the teeth as shown in Figs. 1 and 2. The ends of said split ring plate are bent outwardly at right angles to the body portion thereof as shown to form upstanding lugs 12 provided with alined perforations to receive a clamping bolt 13. By tightening the nut 14 on the bolt 13 the ring plate acts to draw the teeth together and toward the axial center of the hub member 5, thereby securely holding them in position, as will be readily understood.

The teeth 6 are securely held in position in the circumferential recess 10 of the hub member 5 by means of the ring plate 11, this being accomplished in the illustrated construction by means of three bolts 15 each of which passes through alined perforations in the ring plate, in one of the teeth 6 and in the flange 9 of said hub member, said bolts being held in position by means of nuts 16. It will be noted that in this construction only three of the several teeth making up the wheel have a hole bored therethrough. The majority of the teeth have no rivet holes at all.

For holding the outer ends of the several teeth 6 in fixed spaced relationship to each other and for reenforcing each of said teeth at a point intermediate its ends, I provide a ring member 17 of U-shaped cross section provided with suitable rectangular openings of proper size and at regularly spaced points in the base wall 18 thereof through which the several teeth of the wheel project. This ring member is formed from a length of flat stock suitably shaped by means of dies, and the ends thereof are welded together at the point 19 in Fig. 1. The teeth 6 fit snugly between the side walls of the U-shaped ring member, and in order to firmly clamp said ring member to the several teeth the side walls of the ring member between adjacent teeth are crimped together as shown at 21. The ring member 17 is of such circumference that the side walls thereof and the crimped portions between the teeth embrace the several teeth at the point intermediate their ends where bending stresses and breakage are more apt to occur during operation.

It will thus be seen that by my present invention I have provided a construction of wheel comprising steel teeth and a cast hub wherein all but three of the several teeth making up the wheel are not weakened by having rivet or bolt holes formed therein, and wherein all the teeth are securely reenforced at the point where bending stresses and breakage are more apt to occur, there being no rivet openings at this point in any of the hoe teeth.

Figure 3:
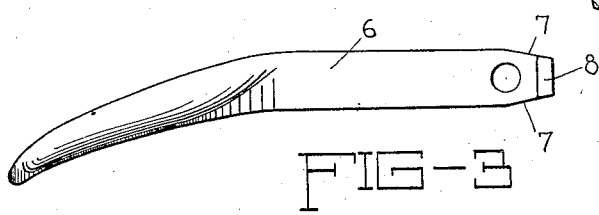
Fig. 3 is a view of one of the teeth of the wheel.

Having thus described the structure of my improved built-up wheel, I shall now describe the various operations in the manufacture of the several parts and the method of assembling such parts to produce the complete wheel. Each steel tooth of the wheel has its outer end shaped to the form shown in Fig. 3, and its inner end bent to form the lug 8 which extends laterally from the main body portion thereof as shown in Fig. 2. The side edges of each tooth adjacent its inner bent end are beveled as shown in Fig. 3. The ring member 17 shown as being substantially U-shaped in cross-section in Fig. 2 is then formed with the openings punched therein at regular spaced intervals for receiving the several teeth. The ring member is then bent by means of suitable dies to form two side portions and a base portion with the side portions bent to a position where they define about a 90° angle between them. This first formation of the ring with the 90° angle between the sides thereof is necessary in order that the laterally extending bent inner ends of the several teeth may be inserted through the openings in the base portion of said ring. Then such bent ends are inserted through their respective openings and nested together in the circumferential recess 10 extending around the cast hub 5. The split ring 11 is then applied, encircling the bent ends of the teeth and being clamped tightly in position by means of the bolt 13 and nut 14. The several bolts extending through the flange of the hub and through three of the teeth and through the split ring 11 are then inserted and secured in position by their respective nuts, thus securely fastening the teeth to the hub. Following this assembly of the several teeth with the hub member the side walls of the ring member 17 are pressed toward each other by suitable dies until such side walls come into contact with the opposite side faces of the teeth 6, as will be readily understood. The side walls of the ring member between adjacent teeth are then distorted by crimping the sides of the ring in between the teeth by means of suitable dies, thereby firmly locking the several teeth in position in the ring.

I claim:—

1. A hoe wheel comprising a hub member, a plurality of teeth radiating from said hub member, means for securing said teeth to said hub member, and means for holding the outer ends of the said teeth in fixed spaced relation to each other.

2. A hoe wheel comprising a hub member, a plurality of teeth radiating from said hub member, a ring plate engaging the inner ends of said teeth, and means for securing said ring plate to said hub member.

3. A hoe wheel comprising a hub member, a plurality of teeth radiating from said hub member, a ring plate engaging the inner ends of said teeth, means for securing said ring plate to said hub member, and means for holding the outer ends of said teeth in fixed spaced relation to each other.

4. A hoe wheel comprising a hub member, a plurality of teeth radiating from said hub member, the inner ends of said teeth being bent laterally, and a ring plate encircling said laterally bent inner ends for securing said teeth to said hub member.

5. A hoe wheel comprising a hub member provided with a circumferential recess, a plurality of teeth radiating from said hub member and provided with laterally bent inner ends seating in said recess, and a ring plate encircling said laterally bent inner ends of said teeth for clamping the same firmly in said recess.

6. A hoe wheel comprising a hub member provided with a circumferential recess, a plurality of teeth radiating from said hub member and provided with laterally bent inner ends seating in said recess, a ring plate encircling said laterally bent inner ends for clamping said teeth firmly in said recess, and means for connecting said ring plate with said hub member.

7. A hoe wheel comprising a hub member provided with a circumferential recess, a plurality of teeth radiating from said hub member and provided with laterally bent inner ends seating in said recess, a split ring plate encircling the laterally bent inner ends of said teeth, and means for drawing the ends of said split ring plate together for clamping the laterally bent ends of said teeth firmly in said recess.

8. A hoe wheel comprising a hub member provided with a circumferential recess, a plurality of teeth radiating from said hub member and provided with laterally bent inner ends seating in said recess, a split ring plate encircling the laterally bent inner ends of said teeth, means for drawing the ends of said split ring plate together for clamping the laterally bent inner ends of said teeth firmly in said recess, and means for connecting said split ring plate to said hub member.

9. A hoe wheel comprising a hub member provided with a circumferential recess, a plurality of teeth radiating from said hub member and provided with laterally bent inner ends seating in said recess, a split ring plate encircling the laterally bent inner ends of said teeth, means for drawing the ends of said split ring plate together for clamping the inner ends of said teeth firmly in said recess, and means for connecting said split ring plate to said hub, said means comprising bolts passing through alined openings in said split ring plate, certain of said teeth, and said hub member.

10. A hoe wheel comprising a hub member provided with an outwardly extending circumferential flange forming a recess, a plurality of teeth radiating from said hub member and provided with laterally bent inner ends seating in said recess, a ring plate encircling said laterally bent inner ends for clamping said teeth firmly in said recess, and means for connecting said ring plate with said flange.

11. A hoe wheel comprising a hub member provided with an outwardly extending circumferential flange forming a recess, a plurality of teeth radiating from said hub member and provided with laterally bent inner ends seating in said recess, a split ring encircling the laterally bent inner ends of said teeth, and means for drawing the inner ends of said split ring together for clamping the inner ends of said teeth firmly in said recess.

12. A hoe wheel comprising a hub member, a plurality of teeth radiating from said hub member, means for securing said teeth to said hub member, and means for reenforcing said teeth at a point intermediate the ends thereof.

13. A hoe wheel comprising a hub member, a plurality of teeth radiating from said hub member, means for securing said teeth to said hub member, and a ring member for reenforcing said teeth at a point intermediate the ends thereof.

14. A hoe wheel comprising a hub member, a plurality of teeth radiating from said hub member, means for securing said teeth to said hub member, and a U-shaped ring member provided with suitable spaced openings in its base wall through which the several teeth project, said ring plate acting to hold said teeth properly spaced apart and to reenforce the intermediate portions of said teeth.

15. A hoe wheel comprising a hub member, a plurality of teeth radiating from said hub member, means for securing said teeth to said hub member, and a U-shaped ring member provided with suitable spaced openings in its base wall through which the several teeth project, whereby said teeth are held properly spaced apart, the side walls of said ring member being crimped together between adjacent teeth whereby each of said teeth is embraced by the walls of said ring member at a point intermediate the ends of said teeth for reenforcing said teeth.

16. A hoe wheel comprising a hub member provided with a circumferential recess, a plurality of teeth radiating from said hub member and provided with laterally bent inner ends seating in said recess, a split ring plate encircling the laterally bent inner ends of said teeth, means for drawing the ends of said split ring plate together for clamping the laterally bent ends of said teeth firmly in said recess, and a ring member having portions thereof embracing each of said teeth at a point intermediate the ends thereof for reenforcing said teeth.

17. A hoe wheel comprising a hub member, a plurality of teeth radiating from said hub member, the inner ends of said teeth being bent laterally and having adjacent edges beveled to form abutting shoulders when said teeth are nested in assembled relation, a member encircling said bent ends and adapted when tightened to clamp the teeth together, and means securing the teeth to said hub member.

18. The method of forming a hoe wheel consisting of a hub member and separate teeth which comprises forming a circumferential recess around said hub member, suitably shaping the inner ends of the several teeth so as to nest them together around said hub member in said recess, and clamping such inner ends in nested relation securely in said recess.

19. The method of forming a hoe wheel consisting of a hub member and separate teeth which comprises forming a circumferential recess around said hub member, nesting the inner ends of the several teeth together around said hub member in said recess, clamping such inner ends securely in said recess on said hub member, reenforcing the several teeth intermediate their ends by means of a substantially U-shaped ring member provided with openings suitably spaced apart in its base wall for receiving the several teeth, and distorting said ring member by crimping the sides thereof between said teeth to lock said teeth in said ring member.

20. The method of reenforcing the several teeth of a hoe wheel which comprises forming a reenforcing ring member of substantially U-shaped cross-section provided with openings suitably spaced apart in its base wall for receiving the several teeth, and locking said teeth in said reenforcing ring member by distorting said ring member by crimping the sides thereof between said teeth.

21. The method of forming a hoe wheel consisting of a hub member and separate teeth which comprises forming a circumferential recess around said hub member, suitably shaping the inner ends of the several teeth so as to nest them together around said hub member in said recess, laterally bending the inner ends of said teeth at right angles to the body portion thereof, clamping such bent inner ends securely in said recess, and reenforcing the intermediate portions of said teeth.

22. A hoe wheel comprising a hub member, a plurality of teeth radiating from said hub member, the inner ends of the teeth being bent, said hub member being provided with a circumferential recess arranged to receive the bent ends of said teeth, and a ring contacting with the radial inner ends of the teeth for holding the bent ends in said recess.

23. A hoe wheel comprising a hub member, a plurality of teeth radiating from said hub member, the inner ends of said teeth being bent and having at least one edge beveled so that said teeth may be nested in assembled relation, and a member encircling the inner ends of said teeth and adapted to cooperate with the hub member to clamp the teeth together.

24. A hoe wheel comprising a hub member, a plurality of teeth radiating from said hub member, the inner ends of said teeth being bent and having at least one edge beveled whereby said teeth may be nested in radially assembled relation, a flange formed on said hub member and provided with a circumferential recess, and a member encircling the inner ends of said teeth and adapted when tightened to clamp the teeth against the flange with the bent ends in said recess.

25. A hoe wheel comprising a hub member, a plurality of teeth radiating from said hub member, means for securing the teeth to said hub member, and a channeled member including a flange portion extending generally radially with respect to said hub member and having a base portion disposed between said teeth for reinforcing the latter.

26. A hoe wheel comprising a hub member, a plurality of teeth radiating therefrom, means for securing said teeth to the hub member, and a channeled ring member cooperating with said teeth for reinforcing the latter at points intermediate the ends thereof, said channeled ring member comprising a flange portion extending generally radially with respect to said hub member and lying adjacent to said spokes and a base portion comprising interrupted sections disposed between each tooth.

27. A hoe wheel comprising a hub member, a plurality of radially extending teeth connected thereto at their inner ends, and means extending between adjacent edges of consecutive teeth for reinforcing the latter.

28. A hoe wheel comprising a hub member, a plurality of teeth radiating from said hub member, means for securing said teeth to said hub member, and a ring member for reinforcing said teeth at a point intermediate the ends thereof, said ring member having portions thereof bent into the space between the teeth.

In witness whereof, I hereunto set my hand this 18th day of May, 1931.

VIRGIL F. BOZEMAN.